US012558977B2

(12) United States Patent　　　　　(10) Patent No.:　　US 12,558,977 B2

Galigekere et al.　　　　　　　　　　(45) Date of Patent:　　Feb. 24, 2026

(54) WIRELESS CHARGING SYSTEM FOR ELECTRIC VEHICLE (EV) BATTERIES

(71) Applicant: UT-Battelle, LLC, Oak Ridge, TN (US)

(72) Inventors: Veda Galigekere, Oak Ridge, TN (US); Subhajyoti Mukherjee, Kharagpur (IN)

(73) Assignee: UT-Battelle, LLC, Oak Ridge, TN (US)

( * ) Notice: Subject to any disclaimer, the term of this patent is extended or adjusted under 35 U.S.C. 154(b) by 613 days.

(21) Appl. No.: 17/959,552

(22) Filed: Oct. 4, 2022

(65) Prior Publication Data

US 2023/0110061 A1　　Apr. 13, 2023

Related U.S. Application Data

(60) Provisional application No. 63/253,145, filed on Oct. 7, 2021.

(51) Int. Cl.
　　B60L 53/122　　　　(2019.01)
　　H02J 7/02　　　　　(2016.01)
(52) U.S. Cl.
　　CPC .............. B60L 53/122 (2019.02); H02J 7/02 (2013.01); B60L 2210/42 (2013.01)

(58) Field of Classification Search
　　CPC ...... B60L 53/122; B60L 2210/42; H02J 7/02; Y02T 10/70; Y02T 10/7072; Y02T 90/12; Y02T 90/14
　　See application file for complete search history.

(56) References Cited

U.S. PATENT DOCUMENTS

| | | | |
|---|---|---|---|
| 8,872,472 B2 * | 10/2014 | Baarman ............. | H02J 7/00034 |
| | | | 320/108 |
| 11,239,699 B2 * | 2/2022 | Leeks ..................... | H02J 50/12 |
| 11,254,226 B2 * | 2/2022 | Maikawa ................ | B60L 53/38 |
| 2016/0368387 A1 * | 12/2016 | Pavlovsky ............ | B60L 53/126 |

FOREIGN PATENT DOCUMENTS

WO　　　　2020/142621　　　　7/2020

* cited by examiner

*Primary Examiner* — Ajay Ojha

(74) *Attorney, Agent, or Firm* — Warner Norcross + Judd LLP

(57)　　　　　　　ABSTRACT

A system and method for controlling output power in an LCC-series wireless power system based on one or more primary-side variables, such as a peak voltage in an LCC-series compensation circuit that is provided in conjunction with a primary coil for transmitting power wirelessly to an electric vehicle. The coupling factor between the primary coil and a receiver may be in the range of 0.1-0.5, and a target power level may be in a range of 50-150 kW.

17 Claims, 5 Drawing Sheets

WIRELESS CHARGING SYSTEM FOR ELECTRIC VEHICLE (EV) BATTERIES

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of wireless power transfer systems, also described as wireless energy transfer systems or a wireless power system.

BACKGROUND

Range anxiety, recharging time, and the cost of electric vehicle (EV) batteries continue to hinder the transition to electrified transportation. Wireless charging based on inductive power transfer offers convenient and hands-free automated charging and can be a viable option to overcome range anxiety and concurrently reducing the required EV battery size and cost. WPT systems are currently being scaled up in power levels that can enable fast EV charging.

Conventional wireless power transfer systems in the realm of EV charging often rely on an LCC compensation circuit in an effort to compensate for a large inductive reactance of the coupling coils (e.g., the transmitter and receiver). This conventional LCC compensation construction is implemented to reduce the coil size in order to accommodate the high power levels needed for electrical vehicle charging applications since the LCC resonant tuning network (also known as compensation network or resonant tuning circuitry) allows injecting higher currents into the transmitter coil. Although this LCC compensation circuit operates well at rated or designed power levels, these conventional systems fail to provide fast charging and effective operation across low and high load operating conditions.

SUMMARY

In general, one innovative aspect of the subject matter described herein can be embodied in a wireless power transfer (WPT) system for wirelessly providing AC power to an electric vehicle or a plug-in electric vehicle. The system may include an off-board module including a primary-side inverter configured to convert, during operation of the WPT system, a DC voltage to a high-frequency AC voltage. The off-board module may include a primary coil configured to wirelessly transmit the high-frequency AC voltage, where the transmitted high-frequency AC voltage is received by a pick-up coil of an onboard module of the WPT system when the pick-up coil is disposed adjacent to the primary coil.

The off-board module may include a primary-side compensating network configured to couple the high-frequency AC voltage between the primary-side inverter and the primary coil, and sensing circuitry configured to measure a signal within the primary-side compensating network. The measured signal may be independent of a coupling factor between the primary coil and the pick-up coil, and a load to which the onboard module is coupled.

The off-board module may include controller circuitry configured to store a reference value (Pref) corresponding to a target power level to be output to the load by the onboard module, and produce a feedback signal (Vin) using the measured signal (vc) and the reference value (Pref).

The off-board module may include driver circuitry configured to produce a driving signal using the feedback signal (Vin), and drive the primary-side inverter using the driving signal.

The foregoing and other embodiments can each optionally include one or more of the following features, alone or in combination. In particular, one embodiment includes all the following features in combination.

In some embodiments, the sensing circuitry may include peak-detection circuitry configured to track a peak of the signal measured within the primary-side compensating network.

In some embodiments, the peak-detection circuitry may include an operational amplifier-based precision full-wave rectifier circuit.

In some embodiments, the primary-side compensating network may be configured as an LCC-series network including a compensating capacitor Cp, a series inductor L, and a series capacitor C, and the sensing circuitry may be configured to measure a voltage signal vct across the series capacitor C.

In some embodiments, the controller circuitry may be configured to produce the feedback signal (Vin) in accordance with an error signal based on the measured signal (vc) and a target value Vcref determined as $$V_{cref} = \frac{X_C}{V_{in}Z_1}\sqrt{V_{in}^4 + 4P_{ref}^2 Z_1^2},$$

where Xc is the capacitive reactance of the series capacitor C at resonance and Zl is the impedance of the series inductor L at resonance, Vin is a present value of the feedback signal, and Pref is the target power level.

In some embodiments, the target power level may be in a range of 50-150 kW, a resistance of the load may be in a range of 0.1-1.0Ω, and the coupling factor may be in a range of 0.1-0.5.

In some embodiments, a frequency of the fundamental component of the high-frequency AC voltage is 85 kHz.

In general, one innovative aspect of the subject matter described herein can be embodied in a wireless power supply for wirelessly transmitting power to a receiver of a remote device. The wireless power supply may include power supply circuitry operable to receive power from a power source, the power supply circuitry configured to output supply power, and switching circuitry operably coupled to the power supply circuitry. The switching circuitry may be configured to generate an AC voltage signal based on the output supply power received from the power supply circuitry.

The wireless power supply may include a transmitter operably coupled to the switching circuitry, where the transmitter may be configured to transmit power wirelessly to the receiver based on the AC voltage signal that is generated by the switching circuitry. The wireless power supply may include compensation circuitry operably coupled to the switching circuitry and the transmitter, where the compensation circuitry may be configured to condition the AC voltage signal generated by the switching circuitry. The wireless power supply may include a sensor operable to provide sensor output indicative of a peak of a characteristic of power in the compensation circuitry.

The wireless power supply may include a control system configured to direct operation of the switching circuitry based on the sensor output indicative of the peak of the characteristic of power in the compensation circuitry.

The foregoing and other embodiments can each optionally include one or more of the following features, alone or in combination. In particular, one embodiment includes all the following features in combination.

In some embodiments, the characteristic of power may be a voltage signal in the compensation circuitry.

In some embodiments, the sensor may be operable to detect a peak voltage of a capacitor provided in the compensation circuitry.

In some embodiments, the peak of the characteristic of power may be independent of a coupling factor between the transmitter and the receiver, and where the peak of the characteristic of power may be independent of a load of the remote device.

In some embodiments, the compensation circuitry may be configured as an LCC-series network including a compensating capacitor Cp, a series inductor L, and a series capacitor C, and the sensor may be configured to measure a voltage signal vct across the series capacitor C.

In some embodiments, the control system may be configured to produce a feedback signal (Vin) in accordance with an error signal based on the peak of the characteristic of power (Vc) and a target value Vcref determined as $$V_{cref} = \frac{X_C}{V_{in}Z_1} \sqrt{V_{in}^4 + 4P_{ref}^2 Z_1^2},$$

where Xc is the capacitive reactance of the series capacitor C at resonance and Zl is the impedance of the series inductor L at resonance, Vin is a present value of the feedback signal, and Pref is a target power level.

In some embodiments, the target power level may be in a range of 50-150 kW.

In general, one innovative aspect of the subject matter described herein can be embodied in a wireless power supply for wirelessly transmitting power to a receiver of a remote device. The wireless power supply may include power supply circuitry operable to receive power from a power source, where the power supply circuitry may be configured to output supply power. The wireless power supply may include switching circuitry operably coupled to the power supply circuitry. The switching circuitry may be configured to generate an AC voltage signal based on the output supply power received from the power supply circuitry. The wireless power supply may include a transmitter operably coupled to the switching circuitry, where the transmitter may be configured to transmit power wirelessly to the receiver based on the AC voltage signal that is generated by the switching circuitry. The wireless power supply may include compensation circuitry operably coupled to the switching circuitry and the transmitter, where the compensation circuitry may be configured to condition the AC voltage signal generated by the switching circuitry.

The wireless power supply may include a sensor operable to provide sensor output indicative a characteristic of power in the compensation circuitry that is independent of a coupling factor between the transmitter and the receiver, where the characteristic of power may be independent of a load of the remote device.

The wireless power supply may include a control system configured to direct operation of the switching circuitry based on the sensor output indicative of the characteristic of power in the compensation circuitry.

The foregoing and other embodiments can each optionally include one or more of the following features, alone or in combination. In particular, one embodiment includes all the following features in combination.

In some embodiments, the characteristic of power may be a peak of a voltage signal in the compensation circuitry.

In some embodiments, the sensor may be operable to detect a peak voltage of a capacitor (C) provided in the compensation circuitry.

In some embodiments, the compensation circuitry may be configured as an LCC-series network including a compensating capacitor Cp, a series inductor L, and a series capacitor C, and the sensor may be configured to measure a voltage signal vct across the series capacitor C.

In some embodiments, the control system may be configured to produce a feedback signal (Vin) in accordance with an error signal based on the peak of the characteristic of power (Vc) and a target value Vcref determined as $$V_{cref} = \frac{X_C}{V_{in}Z_1} \sqrt{V_{in}^4 + 4P_{ref}^2 Z_1^2},$$

where Xc is the capacitive reactance of the series capacitor C at resonance and Zl is the impedance of the series inductor L at resonance, Vin is a present value of the feedback signal, and Pref is a target power level.

In some embodiments, the target power level may be in a range of 50-150 kW.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

A wireless power transfer (WPT) system may vary with load and coupling factor between a transmitter and receiver. For instance, the output power of the WPT system may vary with the load and coupling factor of inductively coupled coils provided respectively by the transmitter and the receiver. A method according to one embodiment of the present disclosure includes controlling the output power of a primary side LCC tuned and a secondary side series tuned system based on information pertaining to primary side variables. In one embodiment, a secondary side control system or secondary side sensors may be absent.

The power output in any WPT system depends on the load and the coupling factor of the inductively coupled coil, both of which invariably varies with the operation of the system. Both primary and secondary side control schemes may be utilized for wireless charging systems. A primary-side controlled WPT system according to one embodiment with a primary LCC and secondary series compensated configuration may include signals (e.g., voltage and/or currents) transferred from the secondary side to the primary side for control purposes. Because the transmitter and receiver are physically separated in this configuration, feedback of signals from the secondary to primary side may be conducted using a wireless communication link. For instance, wireless communications, such as Bluetooth, Wireless Fidelity (WiFi) and dedicated short range communication (DSRC) can be used to transmit signals from primary to secondary side. These wireless communication modes may introduce latencies larger than the switching period. For instance, a delay for wireless communication systems from the secondary to the primary side can be as high as 100 ms. This delay can increase further based on any datatype conversions to interface the communication devices with DSPs (or controllers) on both sides. As described herein, the WPT system utilizes primary-side control in an effort to avoid control methodologies based on secondary-side information; however, it is to be understood that the primary-side control arrangement may be utilized in conjunction with secondary-side information in alternative embodiments.

In one embodiment, one or more primary-side variables (e.g., inductor currents or capacitor voltages on the primary side) may be utilized as a basis for controlling the output power in an LCC-series WPT system. Mathematical derivations are described herein to identify one or more variables that can be used to control the output power, optionally without the need of any information from the secondary side.

Figure 1:
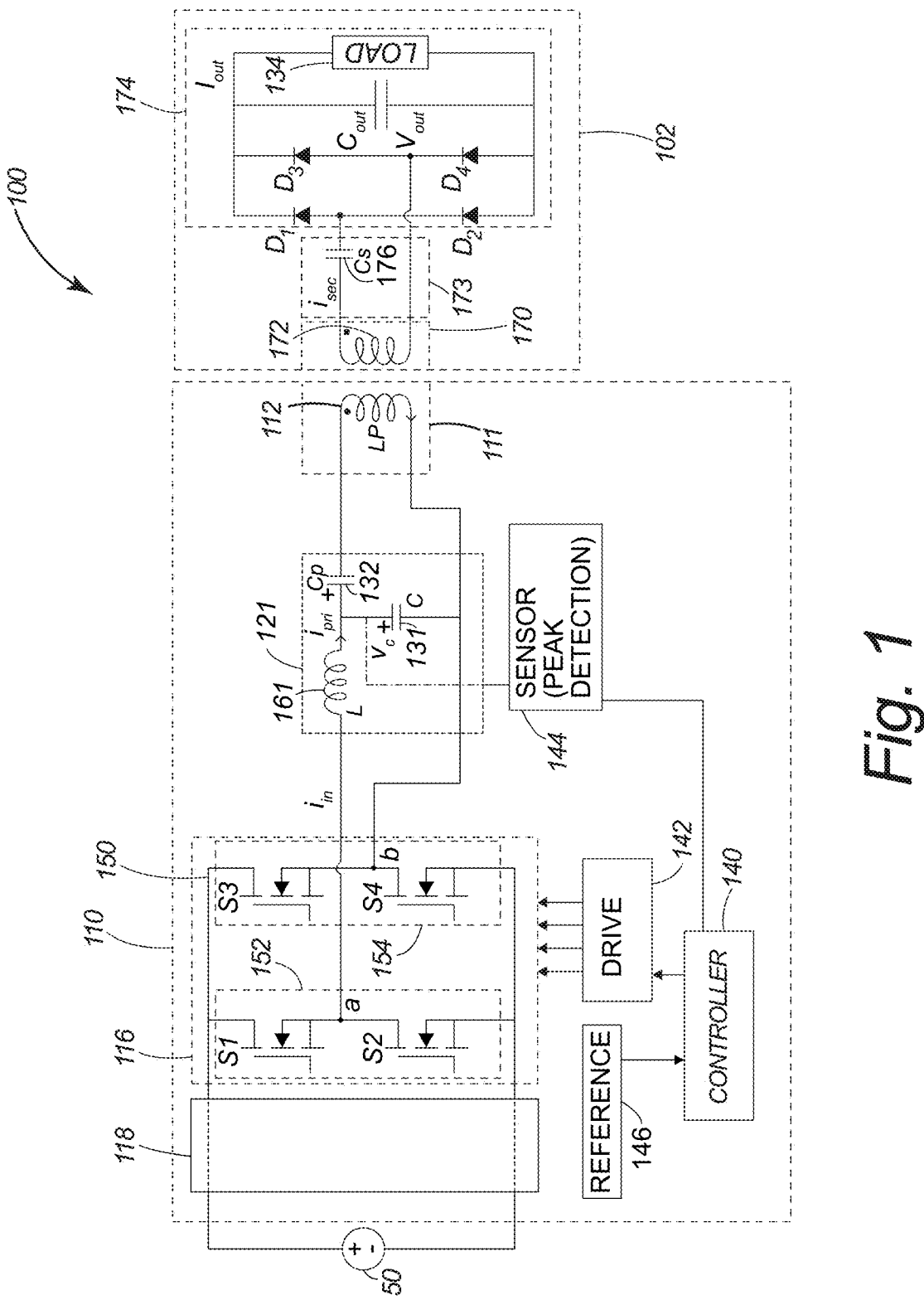
FIG. 1 shows a wireless power supply system in one embodiment according to the present disclosure.
Figure 2:
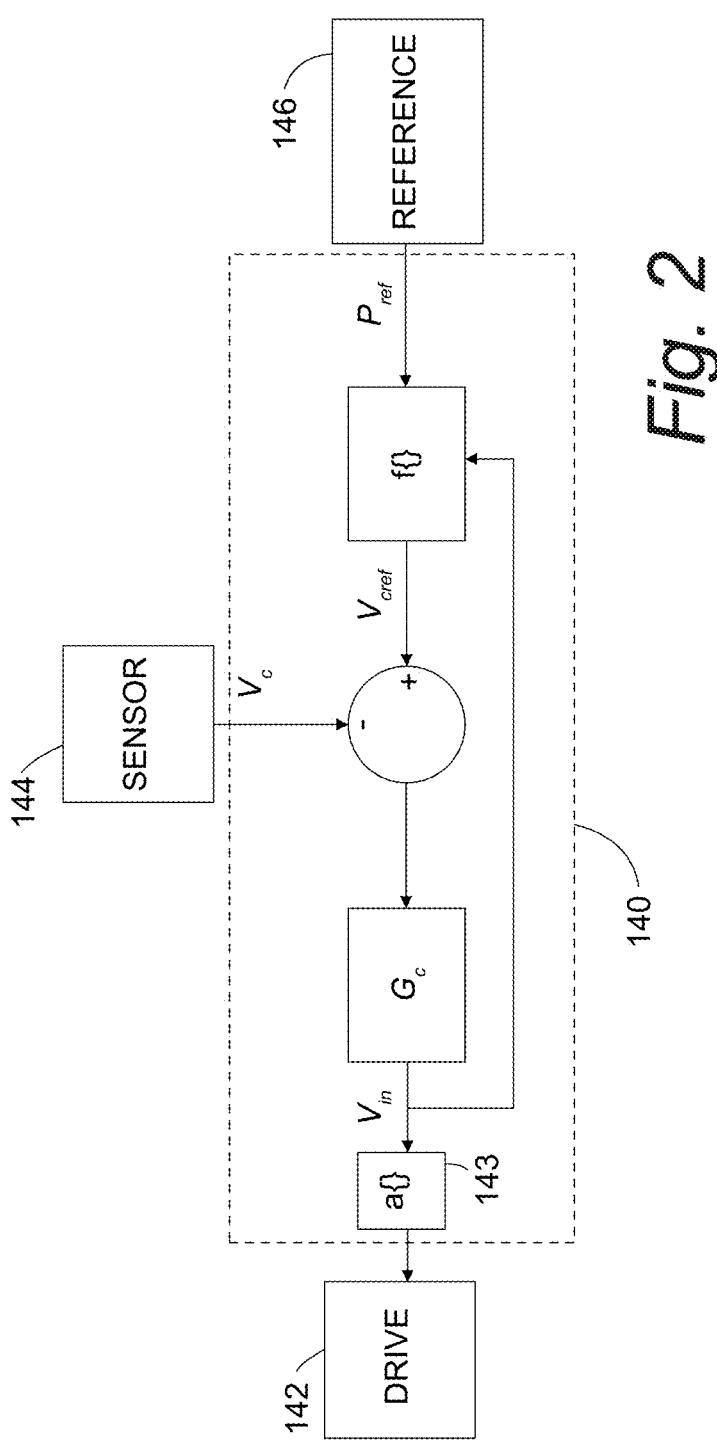
FIG. 2 shows a control loop of the wireless power supply system in one embodiment.

A wireless power system in accordance with one embodiment is shown in FIGS. 1 and 2 and generally designated 100. The wireless power system 100 in the illustrated embodiment includes a remote device 102 and a wireless power supply 110 configured to transmit wireless power to the remote device 102. The remote device 102 may be described as a secondary-side, vehicle-side, or receiver-side with respect to the wireless power supply 110. In one embodiment, the remote device 102 may be operable to transmit power to the wireless power supply 110 (if the diodes in 102 are replaced with active switches), which may be configured to receive wireless power in addition to or as an alternative to transmitting wireless power to the remote device 102. For purposes of disclosure, the remote device 102 is described herein as a vehicle 210; however, the remote device 102 or one or more components thereof may be incorporated into any type of apparatus or device, including, for instance, a mobile phone, a table top appliance, a laptop, a tablet, or a power tool charger or any type of isolated power supply configuration for wireless power with resident converters may be configured in accordance with one or more embodiments described herein.

Additional examples of applications include a vehicle provided as an electric vehicle, a plug-in hybrid electric vehicle, or an electric/plug-in hybrid combat vehicle. Further example applications can relate to energy storage provided in a variety of forms, including a stationary or mobile energy storage system, a low/high voltage battery charger being a cell phone, a laptop, a tablet, a power tool, a gardening tool, a handheld vacuum cleaner, a kitchen gadget, any type of battery charger or adapter, chargers for portable electronics (including cameras, laptops, and cell phones), house-hold appliances with grid isolation requirements, air mobility vehicles (such as electric/hybrid propulsion aircraft, drones, UAVs, and satellites), laser or plasma applications, LEDs, single-phase or three-phase grid systems with medium or low grid voltage networks, fuel cell, solar, or wind turbine renewable energy conversion systems, microturbines (e.g., in grid connected applications), and High Voltage (HV) systems.

Figure 7:
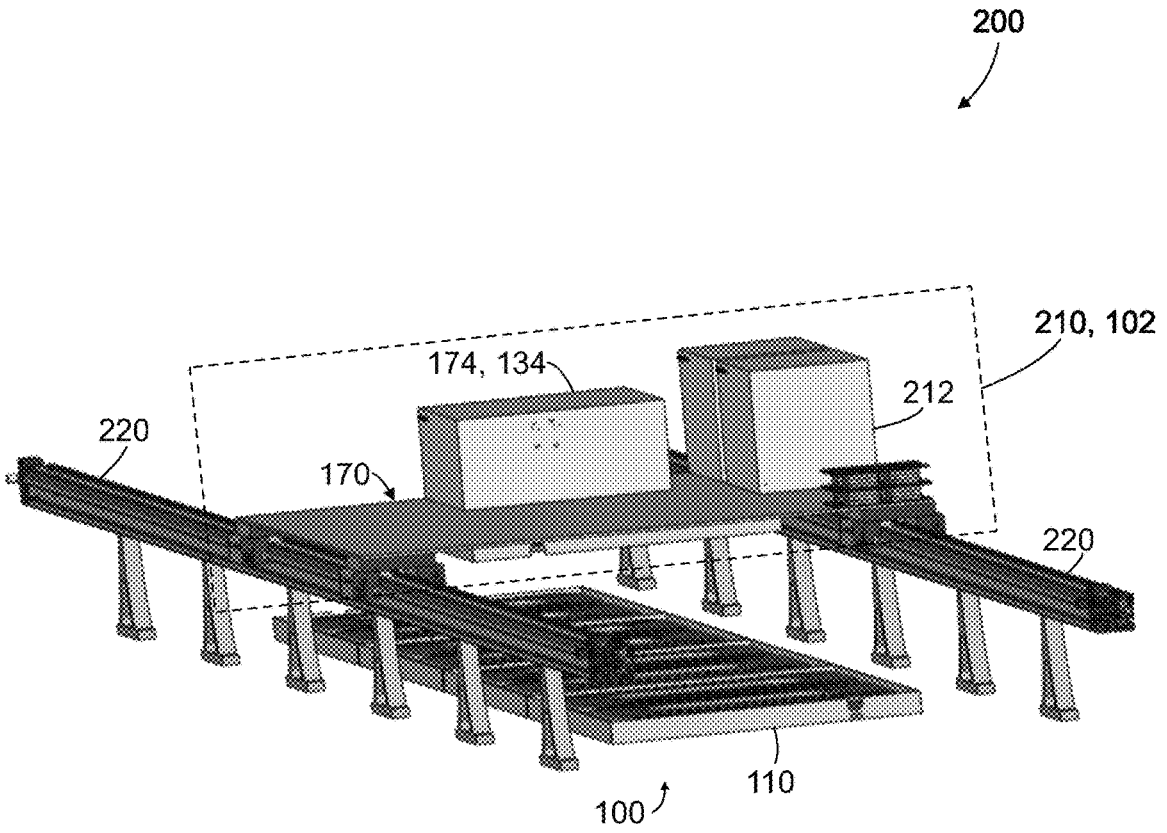
FIG. 7 shows a vehicle system including a wireless power supply system in accordance with one embodiment.

A vehicle system 200 in accordance with one embodiment is depicted in FIG. 7, including a wireless power system 100 in conjunction with a vehicle 210. The vehicle 210 in the illustrated embodiment includes a wireless power receiver (e.g., a receiver) that includes a secondary coil and shielding and that is separable from and capable of coupling with the wireless power supply 110 (e.g., a transmitter), which may also be considered an off-board module. The wireless power receiver 170, as described herein, may be considered an on-board module, and may be configured for transmitting and/or receiving wireless power in one embodiment of the off-board module. The wireless power receiver 170 may form part of an energy storage charging system.

The remote device 102 or vehicle 210 in the illustrated embodiment includes a load 134, such as a battery, operable to use power received wirelessly from the wireless power supply 110. For instance, the wireless power receiver 170 may be coupled to a load 134 to provide power thereto. The load 134 in the illustrated embodiment is part of or coupled to receiver-side circuitry 174 (or secondary-side circuitry) operable to receive power from the wireless power receiver 170. The load 134 may include a battery (or a battery and a battery management system [BMS]) or any type of principle load, or a combination thereof. The wireless power receiver 170 in the illustrated embodiment includes a receiver 172 (e.g., a secondary coil or a pick-up coil).

In the illustrated embodiment of FIG. 1, the wireless power supply 110 may include a wireless power transmitter 111 having a transmitter 112 (e.g., a primary coil) operable to couple with the receiver 172 for wirelessly transferring power, such as by magnetic coupling or inductive coupling. As described herein, the transmitter 112 and the receiver 172 may vary depending on the application, and are not limited to a single primary coil or a single secondary coil.

The wireless power supply 110 may be operable to receive power from a source 50, which may be a DC source. Alternatively, the source 50 may be an AC source, and the wireless power supply 110 may receive power from an AC grid connection. In this configuration, a grid interface converter, such as an AC/DC rectifier may be used to supply power to switching circuitry 116 as described herein. In one embodiment, the AC source before such an AC/DC rectifier may be provided via grid power or utility power, and may be single phase or three-phase depending on the application as described herein.

The wireless power supply 110 in the illustrated embodiment includes a controller 140 operably coupled to drive circuitry 142. The drive circuitry 142 may include a multiplexor or signal conditioning circuitry, or both, in the form of a gate driver interface to translate output from the controller 140 to direct operation of the switching circuitry 116. Alternatively, the drive circuitry 142 may correspond to pass through conductors that provide a direct connection between switching circuitry 116 and the controller 140.

The wireless power supply 110 may optionally include a sensor 144. The sensor 144 may be configured to detect a characteristic of power of the wireless power supply 110, such as a characteristic of power in compensation circuitry 121 of the wireless power supply. The characteristic of power may pertain to a voltage or current measured or determined with respect to the wireless power supply 110. For instance, in the illustrated embodiment, the sensor 144 is a peak voltage sensor operable to generate a signal indicative of a peak voltage in the compensation circuitry 121. The output from the sensor 144 may be digital or analog and indicative of the detected characteristic of power. This output from the sensor 144 may be provided to the controller 140. The sensor 144 is shown separate from the controller 140, but may be integral therewith in one embodiment. The sensor 144 is not limited to the configuration described and shown in conjunction with FIG. 1—for instance, the sensor 144 may sense a characteristic of power in a portion of the wireless power supply 110 different from the compensation circuitry 121.

The compensation circuitry 121 may be configured in a variety of ways, and is not limited to those described in conjunction with the embodiments of FIG. 1. For example, the compensation circuitry may be configured in any manner, including a series-series, series-parallel, parallel-series, and parallel-parallel, or higher order resonant tuning networks, or any combination thereof.

The switching circuitry 116 in the illustrated embodiment includes an H-bridge inverter configuration (e.g., a full bridge) with first, second, third, and fourth switches S1, S2, S3, S4 capable of operating in conjunction with each other to supply power to the transmitter 112. The switches S1, S2, S3, S4 may be arranged in an H-bridge configuration with a first leg 152 and a second leg 154. The switching circuitry 116 may also be a three-phase inverter with the addition of another phase-leg.

The switching circuitry 116 may be configured to receive input power 150 from the power supply 50, and to generate AC power to be supplied to the transmitter 112. The controller 140 may direct operation of the switching circuitry 116 according to a switching frequency and duty cycle (pulse width) to generate the high-frequency AC power. The switching frequency may be between 3 kHz and 10 MHz, and may optionally be about 85 kHz. In one embodiment, the controller 140 may be operable to vary a switching frequency of the switching circuitry 116. As an example, the controller 140 may obtain sensor feedback from the sensor 144, and adjust the switching frequency or the duty cycle (e.g., pulse width) based on the sensor feedback.

In an alternative embodiment, the switching circuitry 116 may be provided in a half bridge configuration with first and second switches operable to provide power to the transmitter 112. The drive circuitry in this alternative embodiment may be different from the drive circuitry 142 in order to drive first and second switches instead of four switches.

The switches S1, S2, S3, S4 may be MOSFETs or any other type of switch capable of selectively supplying power to the transmitter 112, including for example IGBTs.

In the illustrated embodiment, the wireless power supply 110 includes power conditioning circuitry 118 capable of conditioning the power received from the power source 50. The power conditioning circuitry 118 in the illustrated embodiment corresponds to a pass-through configuration between the power supply 50 and the switching circuitry 116. However, the present disclosure is not so limited. As an example, the power conditioning circuitry 118 may correspond to rectification circuitry operable to rectify AC power received from an AC power source into DC power as the input power 150 is provided to the switching circuitry 116. Additionally, or alternatively, the power conditioning circuitry may include filter or compensation circuitry, such as a choke inductor, a parallel capacitor, or a combination of an inductor and capacitor to form a filter at the point of grid connection. If the power conditioning circuitry 118 is utilized for a grid interface, then the source 50 may be a single or three-phase AC source. If a grid interface is not used or bypassed, then the source 50 is a DC source.

The controller 140 may be coupled to one or more components of the wireless power systems to achieve operation in accordance with the described functionality and methodology.

The controller 140 may include electrical circuitry and components to carry out the functions and algorithms described herein. Generally speaking, the controller 140 may include one or more microcontrollers, microprocessors, digital signal processors (DSP), and/or other programmable electronics that are programmed to carry out the functions described herein. The controller 140 may additionally or alternatively include other electronic components that are programmed to carry out the functions described herein, or that support the microcontrollers, microprocessors, and/or other electronics. The other electronic components include, but are not limited to, one or more field programmable gate arrays (FPGAs), systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the system or aspects thereof, or they may reside in a common location within the system or an aspect thereof. When physically distributed, the components may communicate using any suitable serial or parallel communication protocol, such as, but not limited to, CAN, LIN, Vehicle Area Network (VAN), FireWire, I2C, RS-232, RS-485, Ethernet, LAN, WiFi, and Universal Serial Bus (USB).

In the illustrated embodiment of FIG. 1, the wireless power supply 110 includes a first compensation circuit 121 configured as an LCC compensation circuit, including a first inductor 161, a first capacitor 131 (also labeled C), and a second capacitor 132 (also labeled $C_p$). As described herein, the first compensation circuit 121 may be configured differently, such that the present disclosure is not limited to an LCC compensation circuit configuration.

In the illustrated embodiment FIG. 7, the wireless power system 100 is shown in conjunction with a remote device 102 in the form of a vehicle 210. The vehicle 210 is shown additionally in conjunction with a vehicle system 200 with support rails 220 over which the vehicle 210 is configured to travel. The vehicle 210 may be a rail car or train car, and the vehicle system 200 may include a plurality of transmitters 172 configured to transmit power to the receiver 170 of the vehicle 210 as the vehicle 210 travels over the support rails 220. The vehicle 210 may include instrumentation 212 operable to monitor and optionally report status with respect to components of the vehicle 210, including portions of the receiver circuitry, including the receiver 170 and receiver-side circuitry 174.

The wireless power system 100, in the illustrated embodiment, is configured to receive power from the source 50 in the form of an AC power source, and includes power conditioning circuitry 118 configured to rectify the AC power received from the source 50 into DC power for the switching circuitry 116. The first compensation circuitry 121 may be provided, as described herein, between the switching circuitry 116 and the transmitter 112. By selective control of the switching circuitry 116, power may be supplied to the transmitter 112 via the first compensation circuitry 121 in order to transfer power wirelessly to the receiver 172.

Power transmitted wirelessly from the transmitter 112 to the receiver 172 may be provided to receiver-side circuitry 174, which may rectify AC power output from the receiver 172 into DC power supplied to the load 134 (e.g., a battery).

Optionally, the wireless power system 100 may include remote device compensation circuitry, which may be configured in a manner similar to the first compensation circuitry 121.

For a wireless power system 100 in accordance with one embodiment, the primary coil, also described as a transmitter coil or the transmitter 112 or transmitter inductance, may vary from application to application depending on construction, a primary coil current, or a power level, or a combination thereof.

Figure 4:
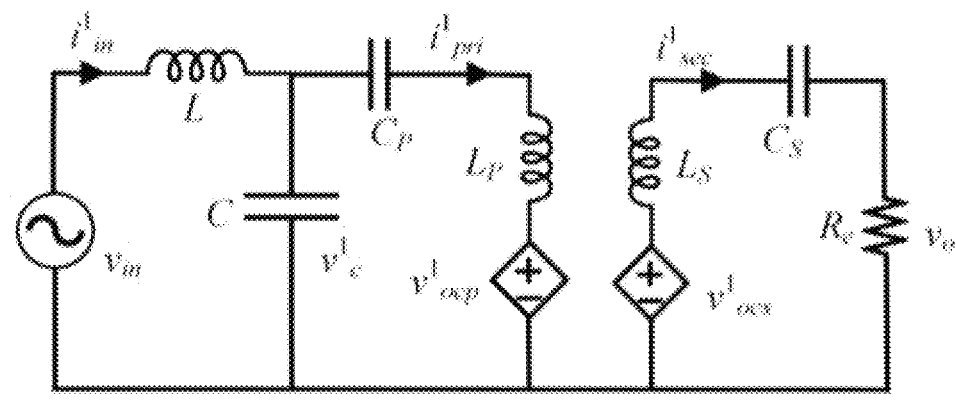
FIG. 4 shows an equivalent circuit according to one embodiment.

A control architecture in accordance with one embodiment is based on primary-side control of the wireless power system 100 described in conjunction with FIGS. 1 and 2. The wireless power system 100, as described herein, may include compensation circuitry 121 in the form of a primary side LLC circuit. The remote device 102 may include a secondary series compensation circuit 173, including a capacitor Cs, 176. The inductor L of the compensation circuitry 121 may be tuned to the parallel capacitor C. The primary-side series capacitance CP may be tuned to (L$_P$–L) while the secondary capacitance Cs, 176 is tuned to L$_S$. The first harmonic approximated (FHA) circuit is shown in FIG. 4. In FIG. 4, v$_{in}$ and v$_o$ are the fundamental components of the voltage across the terminals a, b and x, y respectively. The open circuit voltage v$_{ocp}$ and v$_{ocs}$ are dependent on the primary and secondary current i$_{pri}$ and i$_{sec}$ and are related as $$v_{ocp}{}^1 = jZ_M i_{sec}{}^1 \tag{1}$$

$$v_{osc}{}^1 = jZ_M i_{pri}{}^1 \tag{2}$$

In (1) and (2), Z$_M$ (Z$_M$=2πf$_r$k$\sqrt{L_P L_S}$) is the mutual reactance at resonance. The dependent voltage source v$_{ocp}$, for WPT with series compensated secondary, can be modeled as an equivalent resistance at resonance. The value is given as $$R_{eq} = \frac{v_{ocp}}{i_{pri}} = \frac{Z_M^2}{R_e} \tag{3}$$

Figure 5:
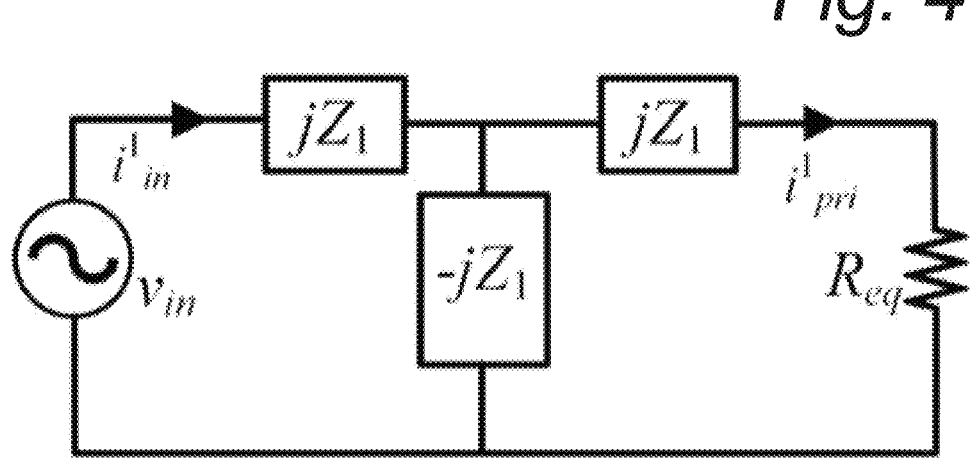
FIG. 5 shows an equivalent circuit according to one embodiment.
Figure 6:
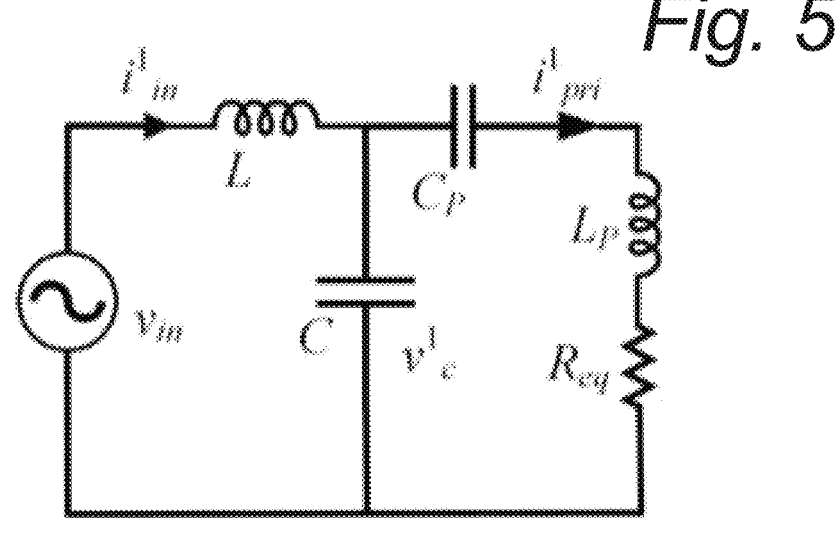
FIG. 6 shows an equivalent circuit according to one embodiment.

Using (3), the primary side equivalent circuit can be represented as in FIG. 5, which, considering the tuning conditions can be further simplified as FIG. 4. Solving the circuit as in FIG. 6, and using (3), the current i$_{in}$, is obtained as $$i_{in}^1 = \frac{Z_M^2}{R_e Z_1^2} v_{in} \tag{4}$$

Using (4), the primary coil current i$_{pri}$, is given as $$i_{pri}^1 = \frac{-jZ_1}{R_e} i_{in}^1 = -j\frac{v_{in}}{Z_1} \tag{5}$$

Substituting i$_{pri}$ from (5) in (2), v$_{ocs}$ as obtained as $$v_{osc}^1 = \frac{Z_M}{Z_1} v_{in} \tag{6}$$

Observing the secondary side equivalent circuit as in FIG. 4, and using the information from (5), the output voltage is given by $$v_o = \frac{Z_M}{Z_1} v_{in} \tag{7}$$

Using the information of v$_o$ from (7), the power across the equivalent resistor R$_e$ is given as $$P_{ac} = \frac{v_o^2}{R_e} = \frac{Z_M^2}{R_e Z_1^2} v_{in}^2 \tag{8}$$

while the output power P$_{out}$ at the load is related to P$_{ac}$ as P$_{ac}$=2P$_{out}$. Using this relation in (8)

$$P_{out} = \frac{Z_M^2}{2R_e Z_1^2} v_{in}^2 \tag{9}$$

The current through the primary side parallel capacitor is also derived. From the equivalent circuit in FIG. 6, the capacitor current i$_c$, can be found as $$i_c^1 = \frac{R_{eq} + jZ_1}{R_{eq}} i_{in}^1 \tag{10}$$

Using (3) and (4) in (10)

$$i_c^1 = \left( \frac{Z_M^2}{R_e Z_1^2} + j\frac{1}{Z_1} \right) v_{in} \tag{11}$$

Figure 3:
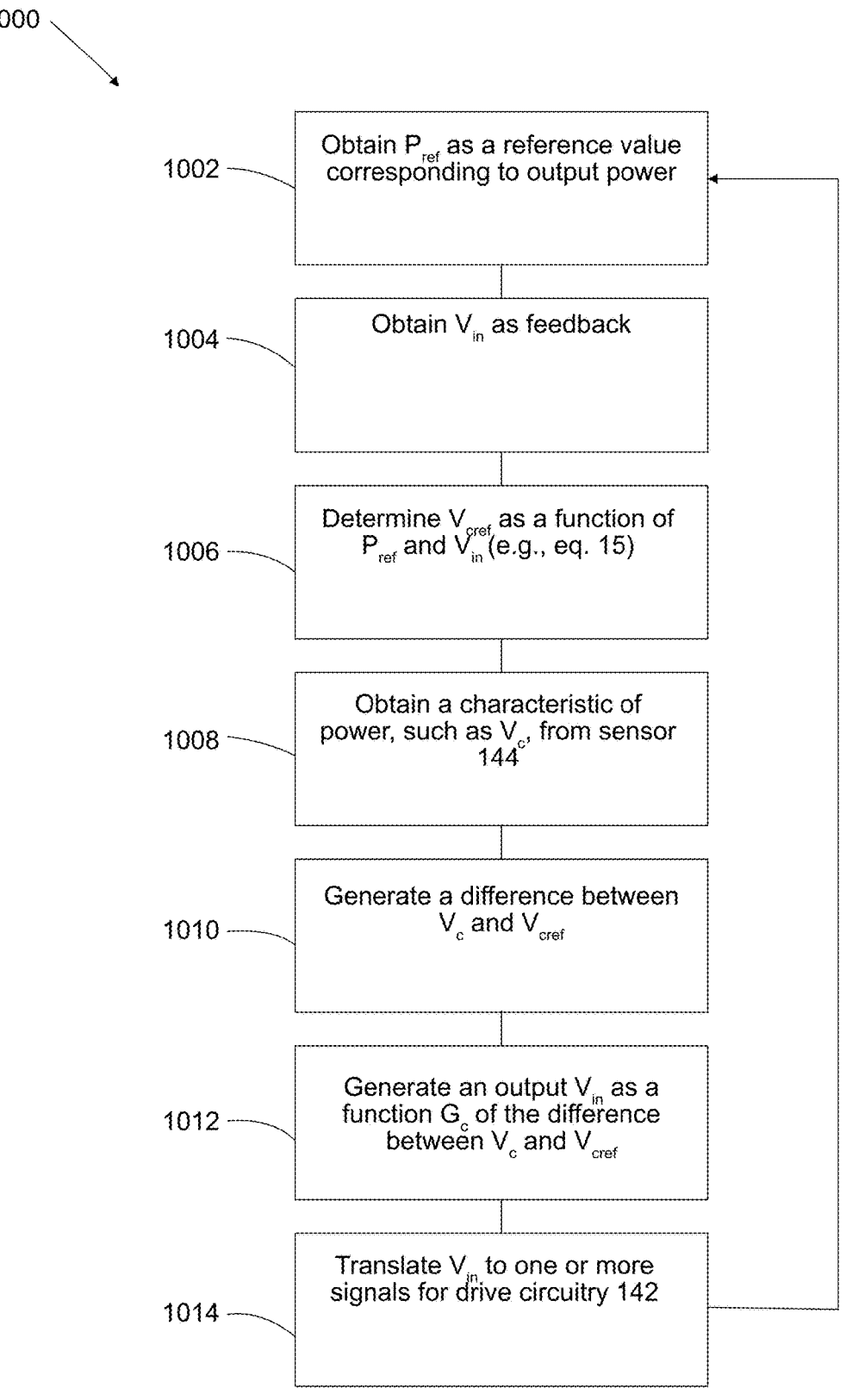
FIG. 3 shows a method of operation according to one embodiment.

A method of controlling operation in accordance with one embodiment is depicted in FIGS. 2 and 3 and designated 1000. The method may involve controlling power transfer from the wireless power supply 110 by controlling a characteristic of power, such as a voltage or a current on the primary side, which indirectly controls the output power.

In one embodiment, for a given input voltage, primary coil current, $i_{pri}$, may be constant (as in (5)) and hence cannot be used to control the output power. The input current, may be dependent on the load and mutual impedance (as in (4)) and can be represented as a function of the output power (as in (9)). It is noted, however, that the equations derived based on an FHA equivalent circuit may yield different results than in an actual scenario in which $i_{in}$ has significant third and fifth harmonic components for an LCC-series WPT system. As a result, $i_{in}$ may not be used as a basis for controlling the output power—although it is to be understood that the present disclosure is not so limited, such that $i_{in}$ may be used as a basis for controlling the output power in one or more alternative embodiments.

In one embodiment, the capacitor voltage, $v_c$, of the capacitor C may be utilized as a basis for controlling the output power. The capacitor C also acts as an inherent low pass filter eliminating higher order harmonics from $v_c$. As a result, in this case, $v_c$ from the FHA circuit is considered to be an accurate approximation of the actual capacitor voltage. Using (9) in (11)

$$i_c^1 = \left( \frac{2P_{out}}{v_{in}^2} + j\frac{1}{Z_1} \right) v_{in} \tag{12}$$

Representing $X_C$ as the capacitive reactance at resonance, capacitor voltage $v_c$ is given as $$v_c = -jX_C \left( \frac{2P_{out}}{v_{in}^2} + j\frac{1}{Z_1} \right) v_{in} \tag{13}$$

The peak value of the capacitor voltage $v_c$ can be found as $$V_c = \frac{X_c}{V_{in}Z_1} \sqrt{V_{in}^4 + 4P_{out}^2 Z_1^2} \tag{14}$$

In (14), $V_{in}$ represents the peak value of the $v_{in}$, which is the voltage across nodes a and b of the switching circuitry 116. The voltage $V_{in}$ is depicted in the illustrated embodiment of FIG. 2 as an output of a closed loop control function $G_c$ implemented in the controller 140. The voltage $V_{in}$ in this configuration may be translated by the controller 140 via an adapter 143 (e.g., an adapter function) into one or more signals provided to the drive circuitry 142 to control the switching circuitry 116 to operate with a voltage $v_{in}$ that corresponds to the target voltage $V_{in}$ provided by the closed loop control function $G_c$.

Equation (14) gives a nonlinear relationship relating the peak value of the capacitor voltage $v_c$ to the output power. The equation is independent of the load and the coupling factor of the coils and is dependent on $Z_1$, $X_C$ and $V_{in}$. The relation as given in (14) can be used to generate a reference for $V_c$, e.g., reference value $V_{cref}$, to obtain a target load power. Substituting $P_{out}$ in (14) with a reference 146 corresponding to a target output power, $P_{ref}$, the target value of $V_c$ is given as $$V_c = \frac{X_C}{V_{in}Z_1} \sqrt{V_{in}^4 + 4P_{ref}^2 Z_1^2} \tag{15}$$

The target value of $V_c$ determined according to (15) may be provided as an input $V_{cref}$ to a feedback aspect of the closed loop control methodology depicted in FIGS. 2 and 3. Steps 1002, 1004, 1006. In other words, a closed loop control methodology according to FIGS. 2 and 3 can be used to track $V_{cref}$, which is based in the reference 146 and the present, target input voltage $V_{in}$. The function f{ } depicted in FIG. 2 may correspond to eq. 15 or a variant thereof. The feedback aspect may correspond to a difference function operation to generate a difference between the input $V_{cref}$ and the output $V_c$ from the sensor 144. Step 1008, 1010.

The closed loop control function may be integrated into the controller 140 and is designated $G_c$ for the controller 140 in the illustrated embodiment of FIG. 2. In one embodiment, the closed loop control function $G_c$ can be represented as $$G_c(s) = \frac{k_i}{s} \tag{16}$$

The closed loop control function $G_c$ may be operable to generate an output $V_{in}$ based on the difference between $V_{cref}$ and $V_{in}$. Step 1012. This output $V_{in}$ may be translated by adapter 143, as described herein, to facilitate generation of drive signals for the switching circuitry 116 to operate in accordance with the target output $V_{in}$. Step 1014. The target output $V_{in}$ provided from the closed loop control function G, may be provided as feedback in the next cycle for determining the target output $V_{in}$. For instance, method 1000 may be repeated according to a loop interval time that may vary depending on the application in order to iteratively generate the target output $V_{in}$.

The control methodology according to FIGS. 2 and 3 may use information pertaining to the peak value of $v_c$, rather than the whole envelope of $v_c$. For instance, peak detection may be implemented using an operational amplifier-based precision full wave rectifier circuit.

In one embodiment, the output of the controller 140 may serve as the desired input voltage $V_{in}$ and is used to modulate the switches S1-S4 accordingly, such as based on the output from the adapter 143.

Optionally, a method according to one embodiment may include controlling the output power according without any communication from the secondary side.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed as defined as follows:

1. A wireless power transfer (WPT) system for wirelessly providing AC power to an electric vehicle or a plug-in electric vehicle, the system comprising:

an off-board module including:

a primary-side inverter configured to convert, during operation of the WPT system, a DC voltage to a high-frequency AC voltage;

a primary coil configured to wirelessly transmit the high-frequency AC voltage, the transmitted high-frequency AC voltage to be received by a pick-up coil of an onboard module of the WPT system when the pick-up coil is disposed adjacent to the primary coil;

a primary-side compensating network configured to couple the high-frequency AC voltage between the primary-side inverter and the primary coil;

sensing circuitry configured to measure a signal within the primary-side compensating network, wherein the measured signal is independent of a coupling factor between the primary coil and the pick-up coil, the coupling factor being in a range of 0.1-0.5, and a load to which the onboard module is coupled, a resistance of the load being in a range of 0.1-1.0 Ω;

controller circuitry configured to store a reference value (Pref) corresponding to a target power level in a range of 50-150 kW to be output to the load by the onboard module, and produce a feedback signal (Vin) using the measured signal (vc) and the reference value (Pref); and driver circuitry configured to produce a driving signal using the feedback signal (Vin), and drive the primary-side inverter using the driving signal.

2. The system of claim 1 wherein the sensing circuitry comprises peak-detection circuitry configured to track a peak of the signal measured within the primary-side compensating network.

3. The system of claim 2 wherein the peak-detection circuitry comprises an operational amplifier-based precision full-wave rectifier circuit.

4. The system of claim 1 wherein:

the primary-side compensating network is configured as an LCC-series network including a compensating capacitor Cp, a series inductor L, and a series capacitor C, and the sensing circuitry is configured to measure a voltage signal vct across the series capacitor C.

5. The system of claim 4 wherein the controller circuitry is configured to produce the feedback signal (Vin) in accordance with an error signal based on the measured signal (vc) and a target value Vcref determined as $$V_{cref} = \frac{X_C}{V_{in}Z_1}\sqrt{V_{in}^4 + 4P_{ref}^2 Z_1^2},$$

where Xc is the capacitive reactance of the series capacitor C at resonance and Zl is the impedance of the series inductor L at resonance, Vin is a present value of the feedback signal, and Pref is the target power level.

6. The system of claim 1 wherein a frequency of the fundamental component of the high-frequency AC voltage is 85 kHz.

7. The system of claim 1 comprising the on-board module.

8. A wireless power supply for wirelessly transmitting power to a receiver of a remote device, the wireless power supply comprising:

power supply circuitry operable to receive power from a power source, the power supply circuitry configured to output supply power;

switching circuitry operably coupled to the power supply circuitry, the switching circuitry configured to generate an AC voltage signal based on the output supply power received from the power supply circuitry;

a transmitter operably coupled to the switching circuitry, the transmitter configured to transmit power wirelessly to the receiver based on the AC voltage signal that is generated by the switching circuitry;

compensation circuitry operably coupled to the switching circuitry and the transmitter, the compensation circuitry configured as an LCC-series network to condition the AC voltage signal generated by the switching circuitry, the LCC-series network including a compensating capacitor Cp, a series inductor L, and a series capacitor C;

a sensor operable to provide sensor output indicative of a peak of a characteristic of power in the compensation circuitry, wherein the sensor is configured to measure a voltage signal Vct across the series capacitor C; and a control system configured to direct operation of the switching circuitry based on the sensor output indicative of the peak of the characteristic of power in the compensation circuitry.

9. The wireless power supply of claim 8 wherein the characteristic of power is a voltage signal in the compensation circuitry.

10. The wireless power supply of claim 9 wherein the sensor is operable to detect a peak voltage of a capacitor provided in the compensation circuitry.

11. The wireless power supply of claim 8 wherein the peak of the characteristic of power is independent of a coupling factor between the transmitter and the receiver, and wherein the peak of the characteristic of power is independent of a load of the remote device.

12. The wireless power supply of claim 8 wherein the control system is configured to produce a feedback signal (Vin) in accordance with an error signal based on the peak of the characteristic of power (Vc) and a target value Vcref determined as $$V_{cref} = \frac{X_C}{V_{in}Z_1} \sqrt{V_{in}^4 + 4P_{ref}^2 Z_1^2},$$

where Xc is the capacitive reactance of the series capacitor C at resonance and Zl is the impedance of the series inductor L at resonance, Vin is a present value of the feedback signal, and Pref is a target power level.

13. The wireless power supply of claim 12 wherein the target power level is in a range of 50-150 kW.

14. A wireless power supply for wirelessly transmitting power to a receiver of a remote device, the wireless power supply comprising:

power supply circuitry operable to receive power from a power source, the power supply circuitry configured to output supply power;

switching circuitry operably coupled to the power supply circuitry, the switching circuitry configured to generate an AC voltage signal based on the output supply power received from the power supply circuitry;

a transmitter operably coupled to the switching circuitry, the transmitter configured to transmit power wirelessly to the receiver based on the AC voltage signal that is generated by the switching circuitry;

compensation circuitry operably coupled to the switching circuitry and the transmitter, the compensation circuitry configured to condition the AC voltage signal generated by the switching circuitry;

a sensor operable to provide sensor output indicative of a characteristic of power in the compensation circuitry that is independent of a coupling factor between the transmitter and the receiver, wherein the characteristic of power is independent of a load of the remote device and is a peak of a voltage signal in the compensation circuitry, and the sensor is operable to detect a peak voltage of a capacitor (C) provided in the compensation circuitry; and a control system configured to direct operation of the switching circuitry based on the sensor output indicative of the characteristic of power in the compensation circuitry.

15. The wireless power supply of claim 14 wherein:

the compensation circuitry is configured as an LCC-series network including a compensating capacitor Cp, a series inductor L, and a series capacitor C, and the sensor is configured to measure a voltage signal vct across the series capacitor C.

16. The wireless power supply of claim 14 wherein the control system is configured to produce a feedback signal (Vin) in accordance with an error signal based on the peak of the characteristic of power (Vc) and a target value Vcref determined as $$V_{cref} = \frac{X_C}{V_{in}Z_1} \sqrt{V_{in}^4 + 4P_{ref}^2 Z_1^2},$$

where Xc is the capacitive reactance of the series capacitor C at resonance and Zl is the impedance of the series inductor L at resonance, Vin is a present value of the feedback signal, and Pref is a target power level.

17. The wireless power supply of claim 16 wherein the target power level is in a range of 50-150 kW.

\* \* \* \* \*